United States Patent [19]

Price et al.

[11] 4,181,170
[45] Jan. 1, 1980

[54] LOWER BEAD LUBRICATION

[75] Inventors: Joseph C. Price; John F Wood, both of Nashville, Tenn.

[73] Assignee: The Coats Company, Inc., La Vergne,, Tenn.

[21] Appl. No.: 909,539

[22] Filed: May 25, 1978

[51] Int. Cl.² .............................................. B60C 25/00
[52] U.S. Cl. .................................................... 157/1.1
[58] Field of Search .................. 157/1, 1.1, 1.24, 1.26, 157/1.28

[56] References Cited

U.S. PATENT DOCUMENTS

| 3,255,800 | 6/1966 | Strang et al. | 157/1.24 |
| 3,675,705 | 7/1972 | Corless | 157/1.1 |
| 3,677,320 | 7/1972 | Corless | 157/1.1 |
| 3,815,653 | 6/1974 | Scott et al. | 157/1.24 |
| 3,937,264 | 2/1976 | Mikovits et al. | 157/1.1 |

Primary Examiner—James G. Smith
Attorney, Agent, or Firm—Wegner, Stellman, McCord, Wiles & Wood

[57] ABSTRACT

There is provided in a tire changing apparatus of the type having a base, a table on the base for receiving a wheel and supporting the wheel during a tire servicing operation, and a plurality of jets at spaced locations about the table disposed to direct a fluid stream towards a wheel supported on the table, the improvement including a liquid lubricant reservoir and a system for selectively directing a liquid lubricant from the reservoir to at least some of the jets to impinge upon the wheel. The presence of the lubricant assists in tire demounting operations and the seating of beads on tubeless tires.

9 Claims, 5 Drawing Figures

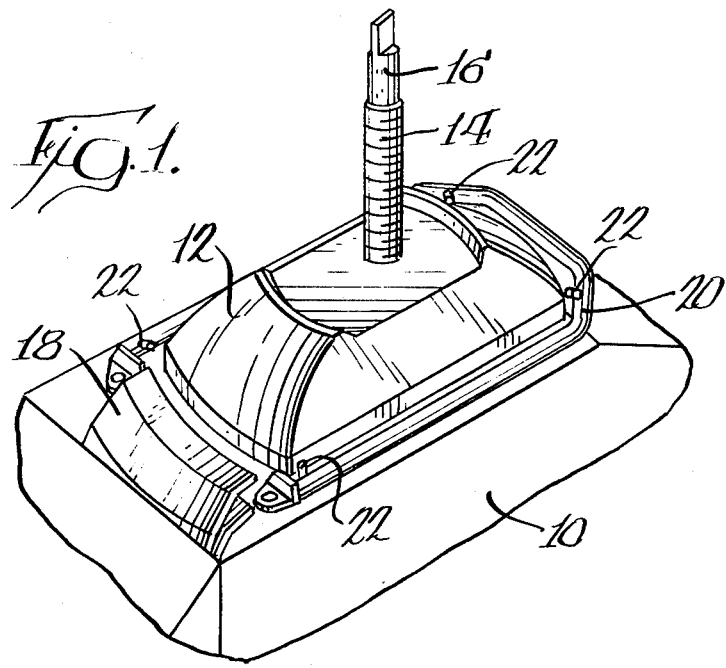
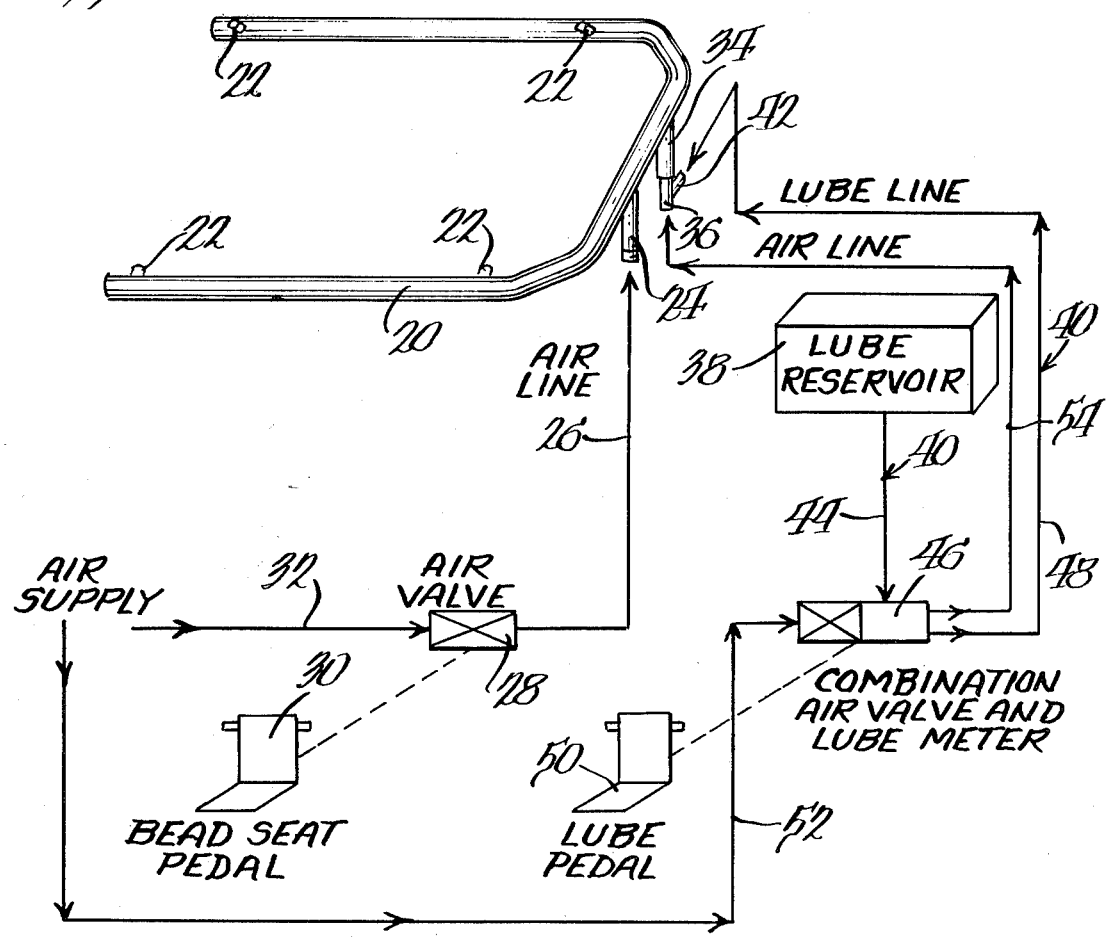

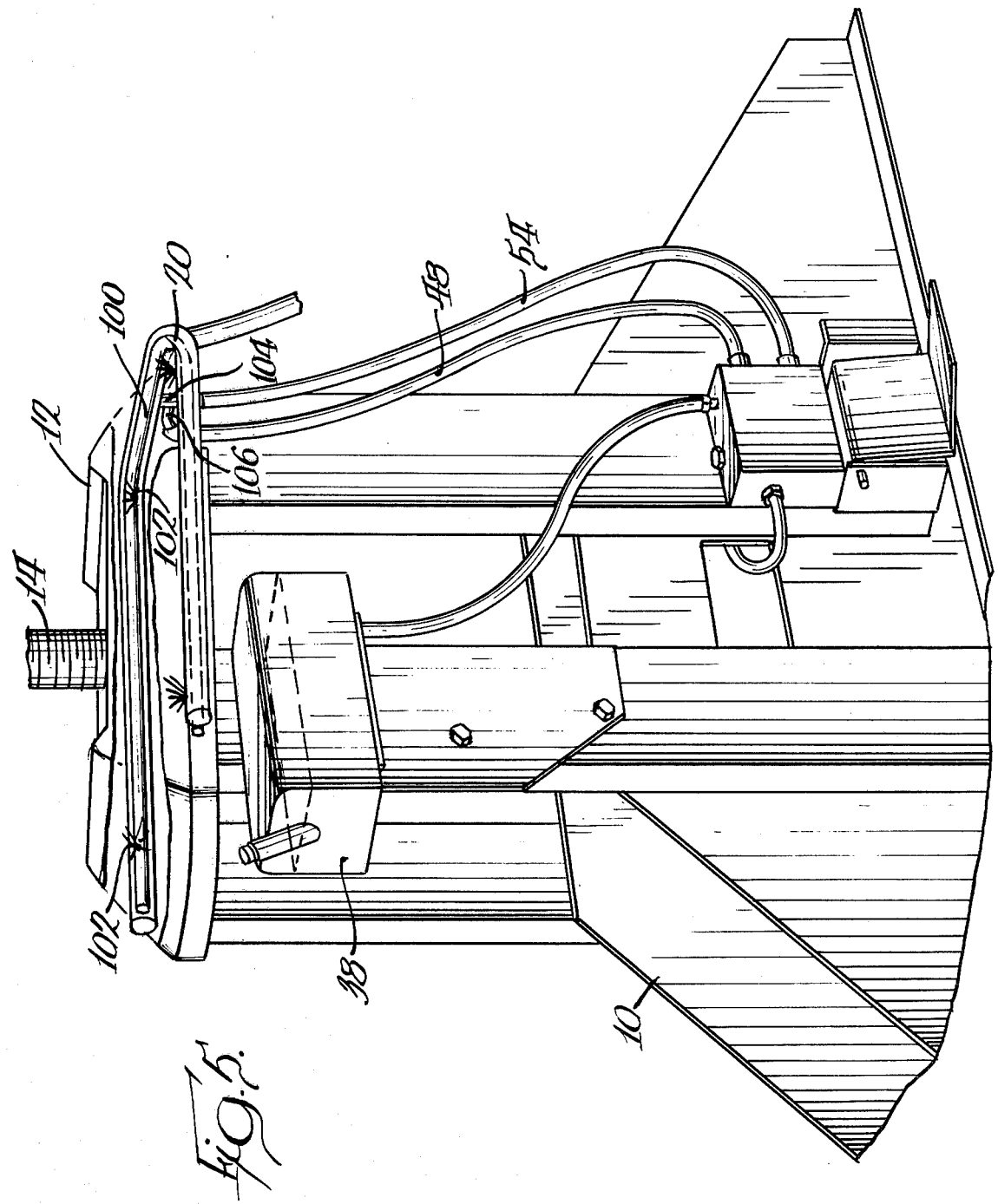

LOWER BEAD LUBRICATION

BACKGROUND OF THE INVENTION

This invention relates to tire changers, and more particularly to the provision of a lower bead lubrication system for use with tire changers.

Tire servicing operations frequently performed on tire changing apparatus include the demounting of tires as well as the seating of the beads of tubeless tires. It has long been known that a tire demounting operation can be performed rapidly while avoiding damage to the beads of the tire if the beads of the tire are lubricated, preferably after being loosened from the rim of the wheel on which the tire is mounted. The lubricant minimizes the friction involved during the usual relative rotation between a tire changing tool and the tire. Thus, for a given tire changing apparatus, the tire demounting operation can be performed more quickly if the beads are lubricated than if they are not for the reason that power required to overcome friction is minimized and therefore can be more usefully employed in performing the relative rotation between the tool and the tire. At the same time, the elimination or minimization of friction avoids the possibility of damage to the beads of the tire during the demounting operation. Consequently, when the tire is remounted, good sealing is assured since the beads have not been damaged.

Heretofore, a container of a suitable lubricant has been maintained in the vicinity of the tire changer and the same has been manually applied to the tire by means of a swab or the like. If the tire has already been placed on the tire changing apparatus, only the upper bead will be accessible so that lubricant cannot be effectively applied to the lower bead. Conversely, if the wheel has not been placed on the tire changer, it is necessary for the operator to stoop to apply lubricant to both beads of the tire. Even when this is done, maximum effectiveness of the lubricant cannot be obtained because in the usual case, the beads will still be set against the rim of the wheel and the lubricant cannot cover the entire bead.

Of course, it would be possible to place the wheel with the tire on the tire changing apparatus, loosen both beads, remove the tire and wheel from the tire changer and apply lubricant to both beads thereof and replace the tire and wheel on the tire changer for the demounting operation. However, this procedure is quite time consuming and virtually never followed. As a consequence, for the most part, most tires are demounted with only their upper bead being lubricated.

The large scale use of tubeless tires requires that the bead be seated to the rims of the wheels on which the tires are mounted. Once sealing contact of the beads with the rims is made, the tires may be quickly inflated to a desired pressure which firmly seats beads against the rims and assures a positive seal. However, in some instances, obtaining good initial sealing contact may be difficult as air may escape through small gaps at the interface of the bead and the rim in sufficient quantities to prevent sufficiently high pressures to achieve good sealing to develop. If the flow of air through such small gaps could be minimized or eliminated allowing rapid pressure buildup, bead seating of tubeless tires could be expedited.

SUMMARY OF THE INVENTION

It is a principal object of the invention to provide a means by which the lower bead of a tire mounted on a wheel received on a tire changing apparatus can be effectively lubricated.

It is also a principal object of the invention to provide a means by which small gaps at the interface of a bead of a tubeless tire and a rim can be altered to minimize air leakage so as to enable a rapid pressure buildup to firmly seat the beads of the tire against the rim.

An exemplary embodiment of the invention achieves the foregoing objects in a tire changing apparatus of the type having a base, a table on the base for receiving a wheel and supporting the same during a tire servicing operation, and a plurality of jets at spaced locations about the table disposed to direct a fluid stream toward a wheel supported on the table.

According to the invention, there is provided the improvement including a liquid lubricant reservoir and a means for selectively directing a liquid lubricant from the reservoir through at least some of the jets to impinge upon a wheel.

When used for lower bead lubrication purposes, the system enables prior loosening of the lower bead before the application of the lubricant while allowing the lubricant to be applied without removing the tire and wheel from the changer.

When used to facilitate bead seating, the lubricant tends to narrow small gaps at the rim-bead interface to minimize or eliminate air flow therethrough enabling rapid pressure buildup within the interior of the tire so as to quickly seat the beads.

Other objects and advantages will become apparent from the following specification taken in connection with the accompanying drawings.

DESCRIPTION OF THE DRAWINGS

FIG. 1 is a fragmentary, perspective view of the tire changing apparatus embodying the invention;

FIG. 2 is a schematic of a lower bead lubricating system made according to the invention;

FIG. 5 is a fragmentary, perspective view of a tire changer provided with a modified embodiment of the invention.

DESCRIPTION OF THE PREFERRED EMBODIMENTS

Figure 3:
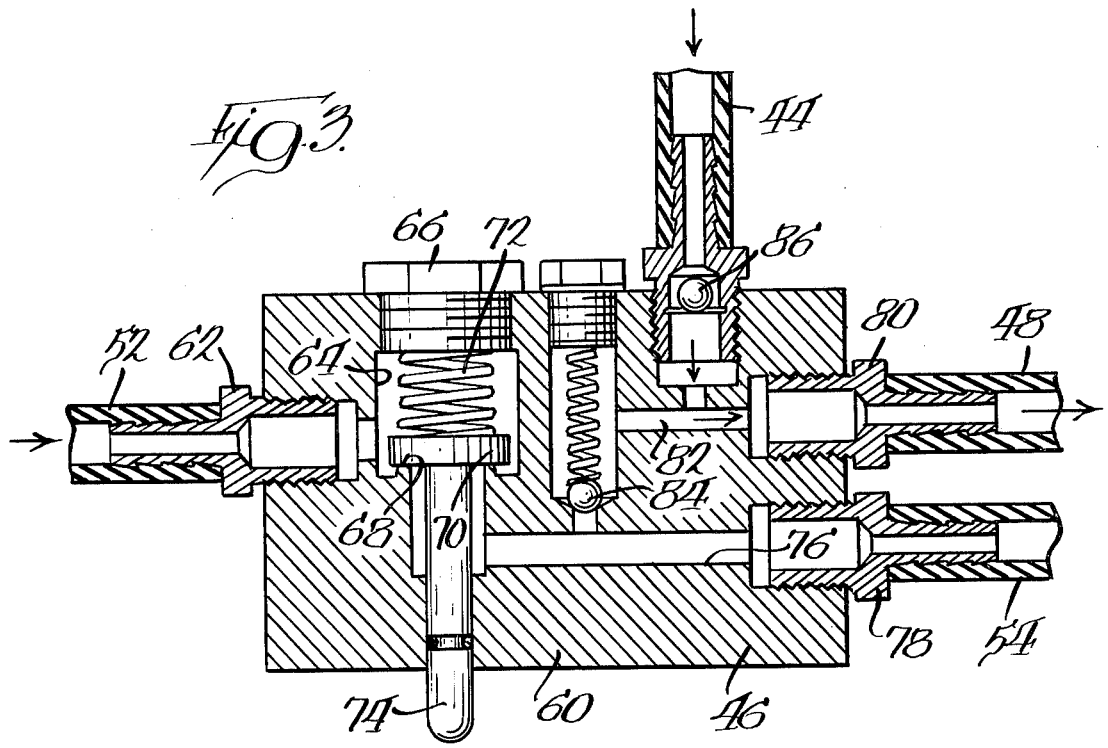
FIG. 3 is a sectional view of a multiple component valve used in the system with the components in a configuration assumed when the system is quiescent.

An exemplary embodiment of the lower bead lubricating system made according to the invention is illustrated in FIG. 1 in connection with a tire changing apparatus which may be generally of the type disclosed in U.S. Pat. No. 3,255,800 issued to Strang et al. The tire changer includes a base 10 on which it may be supported on a floor or the like. The base 10 mounts a generally frusto-conical tabletop 12 which is adapted to receive a wheel with a tire thereon and support the same during the tire servicing operation typically performed on tire changing apparatus.

Concentrically with the tabletop 12, there is an upstanding centerpost 14 topped by a rotatable tire changing tool receiving formation 16.

Adjacent one side of the table 12 is a lower bead loosener assembly 18. The apparatus is also provided with an upper bead loosener assembly (not shown) and the manner in which the foregoing components are operated to perform tire servicing operations is well known and, in any event, may be ascertained by reference to the above identified Strang et al patent.

The upper surface of the base 10 mounts a U-shaped tube 20 which in turn is provided with four spaced jets or nozzles 22 which are disposed to direct fluid streams towards the interface of a rim and a tire when a wheel mounting the tire is received on the tabletop 12 in a conventional fashion. The tube 20 and jets 22 heretofore have been used solely for the purpose of seating beads of tubeless tires received on wheels supported by the tabletop 12 in a manner well known.

Referring to FIG. 2, it will be seen that the tube 20 is U-shaped and includes a downwardly extending nipple 24 at its bight and in fluid communication with the interior of the tube 20. A conduit 26 extends to an air valve 28 which may be operated by a pedal 30. The air valve 28 is connected via a conduit 32 to an air supply, usually in the form of a surge tank. When the pedal 30 is operated to open the air valve 28, air under pressure will be directed out of the jets 22 toward the rim-interface of the wheel assembly on the table to seat the bead thereof.

According to one embodiment of the present invention, a second nipple 34 is also in fluid communication with the interior or the tube 20 and depends from the bight thereof. A tee 36 is connected to the lower end of the nipple 34.

The base 10 in any suitable manner, mounts a liquid lubricant reservoir 38. According to a preferred embodiment, the lubricant reservoir is mounted on the base 10 above the lower extremity thereof and below the jets 22. A preferred location is illustrated in FIG. 5 in connection with a further embodiment of the invention to be described.

A conduit 40 extends from the lubricant reservoir to a branch 42 of the tee thereby establishing a lubricant flowpath from the reservoir 38 to the jets 22. The conduit 40 is made of two sections including a section 44 extending downwardly to a combination air valve and lubricant metering device 46 and a section 48 extending upwardly from the device 46 to the tee 36.

The device 46 is operated by, for example, a pedal 50 and is connected via a conduit 52 to the air supply. Additionally, a further conduit 54 connects the device 46 to the tee 36 in parallel with the section 48 of the conduit 40.

Figure 4:
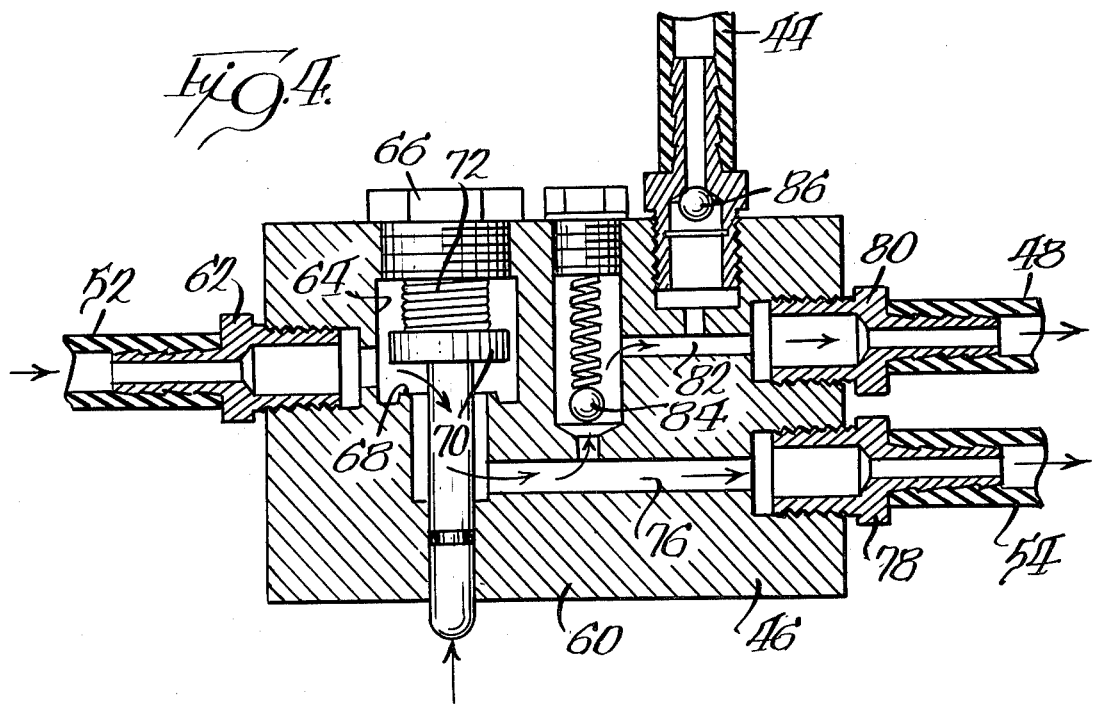
FIG. 4 is a sectional view similar to FIG. 3 but illustrating the configuration of the components when the system is in use.

The construction of the device 46 is best understood from an examination of FIGS. 3 and 4. The same includes a valve body 60 mounting on one end, a fitting 62 to which the conduit 52 is connected. A first bore 64 is disposed within the block and closed by a plug 66. Within the bore 64, there is formed a valve seat 68 and a poppet valve 70 is reciprocally received within the bore 64 and urged against the seat 68 by a spring 72. The poppet valve 70 includes an actuator section 74 which extends exteriorly of the valve body 60 to be suitably engaged by the pedal 50 such that when the pedal 50 is depressed, the poppet valve 70 will be moved away from its seat 68.

The fitting 62 is in fluid communication with the interior or the bore 64. When the poppet 70 is moved away from its seat 68, air under pressure may flow past the seat 68 to an internal passage 76 within the body 60. A fitting 78 is in fluid communication with the passage 76 and mounts the conduit 54. Thus, when the poppet 70 is moved away from its seat 68, air under pressure will be directed through the conduit 54 through the tee 36 and to the interior or the tube 20.

The section 48 of the conduit 40 is connected to the valve body 60 by a fitting 80 which is in fluid communication with a passage 82 within the valve body. The passage 82 is connected to the passage 76 via a check valve 84 disposed to allow fluid flow from the passage 76 to the passage 82 but not the reverse.

The section 44 of the conduit 40 extending from the lubricant reservoir 38 is connected to the passage 82 via a check valve 86 which will allow lubricant to flow from the reservoir 38 into the passage 82 and thus the section 48 of the conduit 40 but prevent reverse flow.

It will be recalled that a portion of the conduit 40 extends below the lubricant reservoir. Consequently, when the poppet 70 is closed, that is in the position illustrated in FIG. 3, lubricant is free to flow from the reservoir 36 past the check valve 86 and into the section 48 of the conduit 40 until the level therein reaches the level of lubricant within the reservoir 38. At this time, flow will cease as the check valve 84 will prevent fluid into the conduit 54. When the poppet 70 is moved to an open position by actuation of the pedal 50 such as shown in FIG. 4, the following occurrences will take place. Firstly, air under pressure will be directed to the tee 36 through the conduit 54. At the same time, the air under pressure will open the check valve 84 and flow from the passage 76 into the passage 82. The air under pressure in the passage 82 will cause the check valve 86 to close and it will act upon the column of lubricant within the section 48 of the conduit 40 between the check valve 86 and the jets 22 thereby urging the same into the tee 36. Because a high volume of air is moving linearly through the tee 36 from the conduit 54 and the liquid lubricant is introduced into the tee 36 through the branch 42, and will not move as rapidly, it will be disbursed or atomized and conducted into the interior of the tube 20 to emerge carried by the air stream from the jets 22 to impinge upon the lower bead of a tire mounted on a wheel recieved on the table 12.

The system provides that a metered amount of lubricant be directed toward the bead as will be recognized by those skilled in the art. In particular, the volume will be generally equal to the mathematical product of the length of the section 48 of the conduit 40 below the lubricant reservoir and the internal cross-sectional area of the section 48. Thus, by varying the length of the section 48 below the reservoir 38 and/or the interior cross sectional area of the same, any desired quantity of lubricant can be appropriately metered from the reservoir 38 for each operation of the system.

In some cases, the material of which the tube 20 is formed may be susceptible to corrosion by materials contained in the liquid lubricant. Since the tube 20 is also used for bead seating purposes, failure due to corrosion is obviously undesirable. To avoid undesirable corrosion in instances where corrosion may be a problem, an alternate embodiment of the invention may be employed.

With reference to FIG. 5, there is seen a U-shaped tube 100, formed of corrosion resistent material such as plastic, mounted just within the confines of the tube 20. The tube 100 is provided with a plurality of spaced jets 102 which are disposed as to direct fluid toward the rim-bead interface. A tee 104 is in fluid communication with the interior or the tube 100 and depends from the bight of the same. The nipple 104 is connected to the conduit 54 to receive the air stream. A branch 106 connects to the nipple 104 intermediate its ends and at an angle thereto and in turn is connected to the section 48 of the conduit 40. All other components of the system remain the same and it will thus be appreciated that lower bead lubrication can be similarly achieved.

As will be appreciated by those skilled in the art, the invention provides for the deposition of a lubricant on the lower bead of a tire on a wheel received on the tabletop 12 so as to facilitate tire demounting. The system can be operated after the lower bead is loosened to insure maximum efficiency of the operation.

It may also be utilized to direct lubricant to the lower rim-bead interface just prior to the use of the bead seating system employed on the tire changer, if used.

It will be further be appreciated that the embodiment illustrated in FIGS. 1 and 2 is advantageous insofar as the lower bead lubricating system of the invention utilizes in part the bead seating components found on many tire changers today. Thus, expense of the system is minimized.

At the same time, the embodiment illustrated in FIG. 5, while somewhat more costly due to the necessity of providing a separate tube such as the tube 100 provides all of the advantages of lower bead lubrication while eliminating any possibility of premature failure of part of the bead seating system due to corrosion or the like.

We claimed:

1. In a tire changing apparatus having a base, a table on the base for receiving a wheel and supporting the same in a wheel servicing position during a tire servicing operation, and a plurality of jets at spaced locations about the table below said wheel servicing position and disposed to direct a fluid stream toward the underside of a wheel supported on the table, the improvement comprising: a liquid lubricant reservoir, and means for selectively directing a liquid lubricant from said reservoir along with a pressurized gaseous medium through at least some of said jets to impinge upon a wheel.

2. In a tire changing apparatus having a base, a table on the base for receiving a wheel and supporting the same during a tire servicing operation, a plurality of jets at spaced locations about the table disposed to direct a fluid stream toward a wheel supported on the table, and selectively operable means for directing air under pressure to at least some of said jets, the improvement comprising: a liquid lubricant reservoir, and means for selectively directing a liquid lubricant from said reservoir through at least some of said jets to impinge upon a wheel.

3. The tire changing apparatus of claim 2 wherein said air directing means and said liquid lubricant directing means direct air and liquid lubricant, respectively, to different ones of said jets.

4. The tire changing apparatus of claim 2 wherein said air directing means and said liquid directing means direct air and liquid lubricant to the same jets.

5. In a tire changing apparatus having a base, a table on the base for receiving a wheel and supporting the same during a a tire servicing operation, and a plurality of jets at spaced locations about the table disposed to direct a fluid stream toward a wheel supported on the table, the improvement comprising: a liquid lubricant reservoir, and means for selectively directing a liquid lubricant from said reservoir along with air under pressure through at least some of said jets to impinge upon a wheel, said air under pressure atomizing said liquid lubricant prior to its impingement on a wheel.

6. In a tire changing apparatus having a base, a table on the base for receiving a wheel and supporting the same during a tire servicing operation, and a plurality of jets at spaced locations about the table disposed to direct a fluid stream toward a wheel supported on the table, the improvement comprising: a liquid lubricant reservoir, means for metering a desired quantity of liquid lubricant from said reservoir and means including a source of pressurized fluid for selectively directing said metered quantity of liquid lubricant from said reservoir combined with pressurized fluid from said source through at least some of said jets to impinge upon a wheel.

7. In a tire changing apparatus having a base, a table on the base for receiving a wheel and supporting the same during a tire servicing operation, and a plurality of jets at spaced locations about the table disposed to direct a fluid stream toward a wheel supported on the table, the improvement comprising: a liquid lubricant reservoir mounted on said base above the lower extremity thereof and below said jets; a conduit interconnecting said reservoir and said jets, said conduit having at least a portion of its length below the lower extremity of said reservoir; valve means in said conduit at a location below said reservoir for allowing flow of liquid lubricant toward said jets and preventing reverse flow; and selectively operable means for driving liquid lubricant in said conduit and between said jets and said valve means towards said jets.

8. The tire changing apparatus of claim 7 wherein said driving means includes an air valve connected to said conduit between said valve means and said jets.

9. The tire changing apparatus of claim 8 further including an additional conduit connected between said jets and said air valve, said first mentioned conduit merging into said additional conduit near said jets whereby air under pressure flowing in said additional conduit will atomize liquid lubricant entering said additional conduit from said first mentioned conduit.

* * * * *